Figure 1:
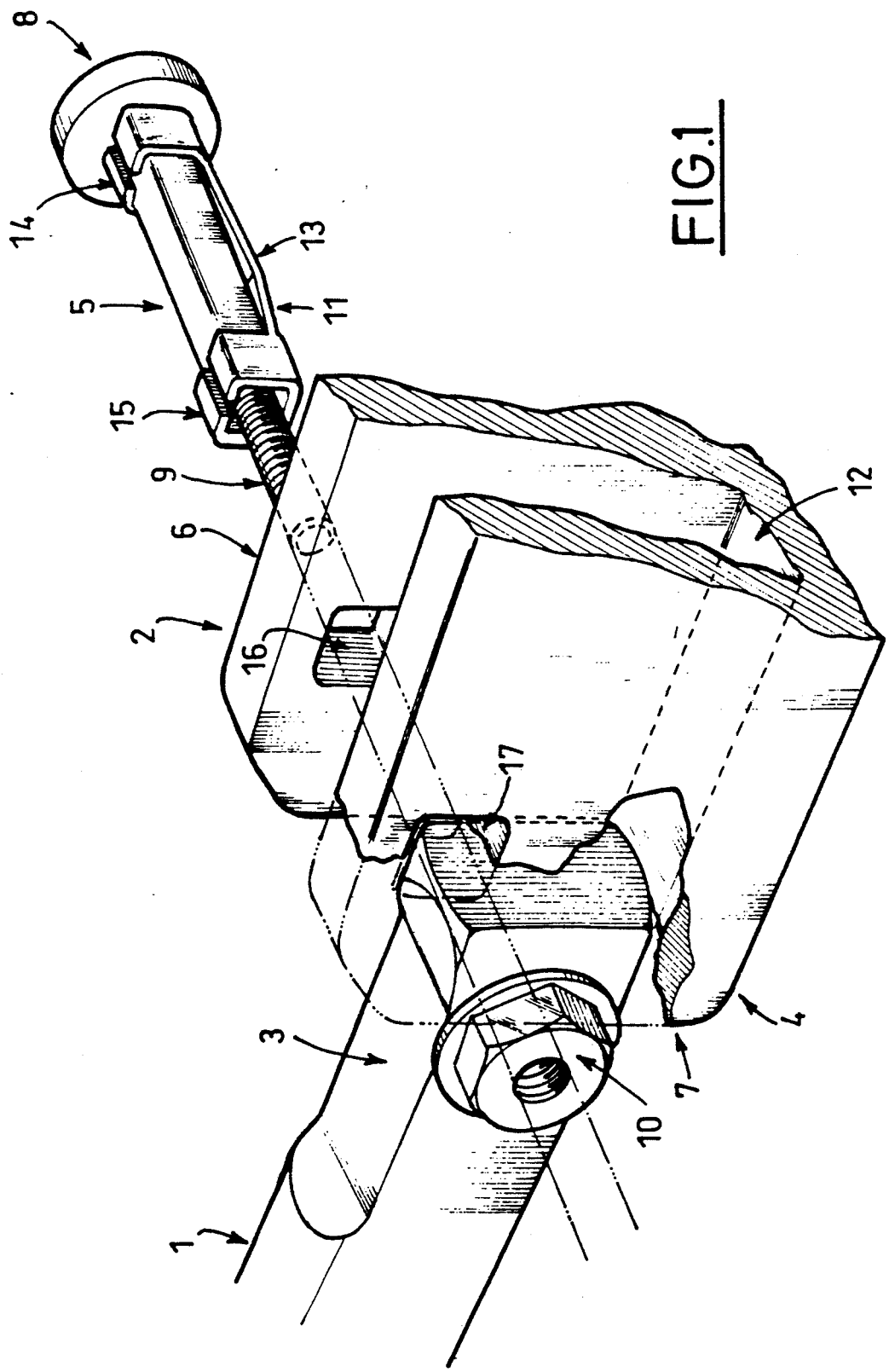

United States Patent [19]

Hoblingre et al.

[11] Patent Number: 5,165,817
[45] Date of Patent: Nov. 24, 1992

[54] SAFETY CLAMPING DEVICE FOR A MALE ELEMENT IN A FORK OF A FEMALE ELEMENT, OF USE IN PARTICULAR FOR INTERCONNECTING TWO PORTIONS OF AN AUTOMOBILE VEHICLE STEERING COLUMN

[75] Inventors: André Hoblingre, Valentigney; Ghislain Passebecq, Audincourt, both of France

[73] Assignee: ECIA, France

[21] Appl. No.: 865,472

[22] Filed: Apr. 9, 1992

[30] Foreign Application Priority Data

Apr. 10, 1991 [FR] France ................. 91 04373

[51] Int. Cl.⁵ .................................................. B25G 3/20
[52] U.S. Cl. .................................... 403/373; 403/379; 403/290
[58] Field of Search ............... 403/11, 373, 290, 379

[56] References Cited

U.S. PATENT DOCUMENTS

| | | | |
|---|---|---|---|
| 3,867,050 | 2/1975 | Pitner ................. | 403/373 |
| 4,628,758 | 12/1986 | Yuzuriha et al. | |
| 4,900,178 | 2/1990 | Haldrie et al. ........ | 403/373 X |
| 5,090,833 | 2/1992 | Oertle et al. ......... | 403/373 X |

FOREIGN PATENT DOCUMENTS 2067783 8/1971 France.
2518924 7/1983 France.
2625538 7/1989 France.

Primary Examiner—Andrew V. Kundrat
Attorney, Agent, or Firm—Sughrue, Mion, Zinn, Macpeak & Seas

[57] ABSTRACT

This device for clamping a male element (3) in a fork (4) comprising two lateral walls (6,7) interconnected by an intermediate wall (12) of a female element is of the type comprising a rod (5) extending between the two lateral walls (6,7) and having an end defining a stop surface (8) bearing against one of the lateral walls (6) and an opposite end (9) which is screw threaded and adapted to cooperate by screwing with a clamping nut (10) for urging the lateral walls (6,7) toward each other and clamping the male element in the fork. Safety means are provided for maintaining the male element (3) in position in the fork (4) in the event of breakage of the rod (5). These safety means comprise a maintaining element (11) disposed alongside the rod and having end portions cooperating with the lateral walls (6,7) of the fork (4) for maintaining the male element in position.

16 Claims, 2 Drawing Sheets

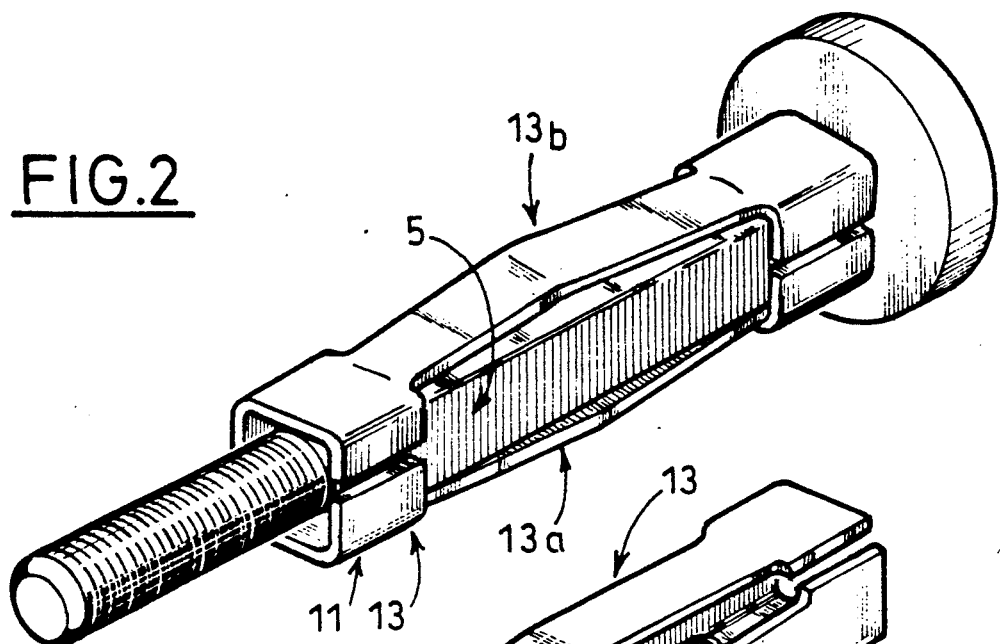
FIG.2
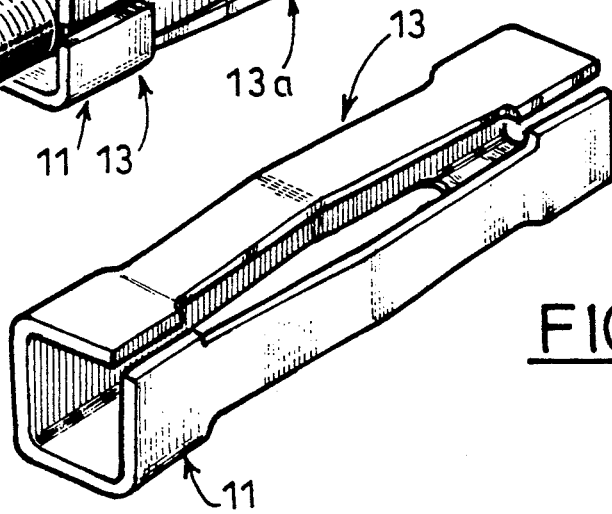
FIG.3
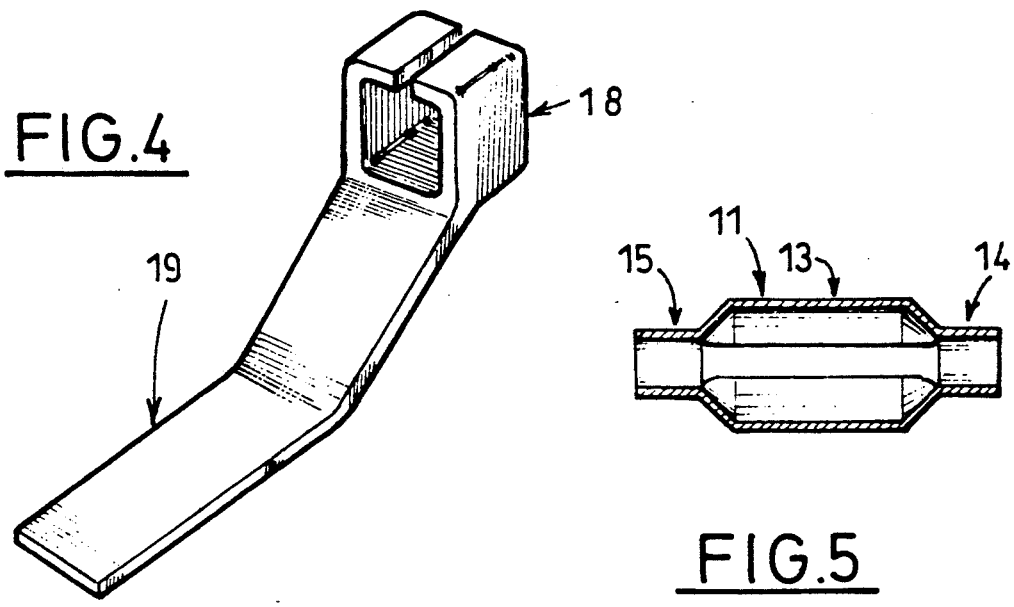
FIG.4
FIG.5

5,165,817

SAFETY CLAMPING DEVICE FOR A MALE ELEMENT IN A FORK OF A FEMALE ELEMENT, OF USE IN PARTICULAR FOR INTERCONNECTING TWO PORTIONS OF AN AUTOMOBILE VEHICLE STEERING COLUMN

The present invention relates to a safety clamping device for a male element in a fork comprising two lateral walls interconnected by an intermediate wall of a female element, of use in particular in the connection of two portions of an automobile vehicle steering column.

More particularly, the device according to the invention may be employed for interconnecting two portions of a steering shaft of a vehicle.

Clamping devices of this type are known in the art and comprise a rod extending between the lateral walls of the fork and having one end which defines a stop surface bearing against one of the lateral walls of the fork and an opposite end which is screw threaded and adapted to cooperate by screwing with a clamping nut, which is for example a stop nut, i.e. a nut prevented from unscrewing, for urging the lateral walls of the fork toward each other and clamping the male element in the fork.

The male element is in this way held in position in the fork, on one hand by the lateral and intermediate walls of the fork and, on the other hand by the rod, so that for example a rotational torque can be transmitted between the two portions of the steering column.

However, this connection is a safety connection and safety means must be provided for holding the male element in position in the fork in the event of a breakage of the rod.

In the art, these means are formed by a clamp disposed around the fork and having branches at the end of which are provided hooks adapted to cooperate with the male element so as to maintain it in position in the fork in the event of breakage of the rod.

It will be understood that this presents a number of drawbacks, the use of this clamp resulting in an increase in the cost price of the device and in mounting difficulties, since this mounting cannot be achieved in an automated manner.

Further, it has been found that owing to tolerances in the manufacture of the various aforementioned elements, a clearance exists between the upper face of the male element and the rod and that this clearance may result in a faulty positioning of the male element in the fork and in an imperfect alignment of the two portions of the shaft.

In order to overcome these problems of a faulty positioning of the male element in the fork and an imperfect alignment of the two portions of the shaft, it has already been proposed in the art to employ means for urging the male element against the intermediate wall of the fork upon the clamping screwing.

These means comprise for example a cam disposed around the rod and applying on the male element a thrust upon the rotation of the rod during the screwing of the stop nut.

However, this device has a number of drawbacks, since the thrust exerted on the male element by the cam is directly proportional to the torque required to stop rotation of the nut. The torque for stopping rotation of the nut is necessarily limited and therefore reduces this thrust force so that the clearances taken up and the maintenance of the male element in the fork are insufficient.

An object of the invention is therefore to overcome these problems by providing a safety clamping device which is simple, low in cost price, has an overall size which is as small as possible, may be mounted in an automated manner and moreover permits applying the male element firmly against the intermediate wall of the fork.

The invention therefore provides a safety clamping device for a male element in a fork having two lateral walls interconnected by an intermediate wall of a female element, of use in particular for interconnecting two portions of an automobile vehicle steering column, of the type comprising a rod extending between the two lateral walls of the fork and having one end defining a stop surface bearing against one of the lateral walls of the fork and an opposite end which is screw threaded and cooperative by screwing with a clamping nut, for urging the lateral walls of the fork toward each other and clamping the male element in the fork, and safety means for maintaining the male element in position in the fork in the event of breakage of the rod, characterized in that the maintaining means comprise a safety maintaining element disposed alongside the rod and having ends which cooperate with the lateral walls of the fork for maintaining the male element.

Advantageously, this maintaining element is adapted to exert a thrust force on the male element against the intermediate wall of the fork.

A better understanding of the invention will be had from the following description which is given solely by way of example with reference to the accompanying drawings, in which:

FIG. 1 is a perspective view of a first embodiment of a safety clamping device according to the invention, and FIGS. 2, 3, 4 and 5 are views of different embodiments of a maintaining and thrust element which is part of a safety clamping device according to the invention.

As can be seen in FIG. 1, a safety clamping device according to the invention may be employed for interconnecting two portions 1 and 2 of for example a shaft of an automobile vehicle steering column.

One of these portions includes a male element, generally designated by the reference character 3 and the other, a fork, for example having a generally U-shaped section, generally designated by the reference character 4.

The male element is consequently inserted in the fork and clamped and locked in the latter by urging the lateral walls of the fork toward each other in the manner described in more detail hereinafter.

This clamping device further comprises a rod 5 extending between the two lateral walls 6 and 7 of the fork and having an end defining a stop surface bearing against one of the lateral walls 6 of the fork 4. The other end of the rod, that is the end 9, is screw threaded and adapted cooperate by screwing with a clamping nut 10 which is for example a stop nut, so as to urge the lateral walls 6 and 7 of the fork toward each other and clamp the male element 3 in the fork.

Safety means 11 are also provided for maintaining the male element 3 in position in the fork 4 in the event of breakage of the rod 5.

These maintaining means comprise in accordance with the invention a maintaining element disposed alongside and for example around the rod 5, the opposite ends of which cooperate with the lateral walls 6 and 7 of the fork for maintaining the male element in position.

This male element is maintained in position between the lateral walls of the fork independently of the rod, as will be described in more detail hereinafter.

This maintaining element consequently permits, in the event of breakage of the rod, maintaining the male element 3 in position in the fork 4, even if the rod breaks in two and the two parts of the latter separate and leave the fork, by preventing the male element from tilting in the fork.

Indeed, this maintaining element may be formed by an element whereby it is possible to exert a thrust force on the male element 3 so as to urge it against the intermediate inner wall 12 of the fork 4, before the clamping of the male element 3 between the lateral walls of the fork 4 by the screwing for example of the nut on the corresponding screw-threaded end portion of the rod.

In the embodiment shown in FIG. 1, this maintaining element has a length greater than the distance between the lateral walls 6 and 7 of the fork 4 before screwing, so as to be radially deformed and consequently urge the male element 3 against the intermediate wall 12 of the fork 4, before the lateral walls 6 and 7 of the latter are urged toward each other upon screwing.

In one embodiment, this deformable maintaining element may comprise a sleeve which is composed of a material deformable by expansion when compressed, and is disposed around the rod.

In the embodiment shown in FIG. 1, the deformable maintaining and thrust element in fact comprises a deformable central web 13 extending alongside the rod between two mounting rings 14 and 15 disposed around the rod in cavities 16 and 17 provided in the lateral walls 6 and 7 of the fork.

This central web 13 is formed by at least one strip of deformable material in one piece with the rings 14 and 15.

Note that foolproof means may be provided for maintaining the maintaining and thrust element in position relative to the male element so that it is engaged between the lateral walls of the fork in such manner that the strip 13 is in confronting relation to the male element 3 and is maintained in this position when the nut is screwed on the rod.

In the embodiment shown in FIG. 1, this maintenance in position and this foolproof arrangement result from polygonal sections, for example rectangular sections, of the rings 14 and 15 of the thrust element and of the corresponding cavities 16 and 17 provided in the lateral walls 6 and 7 of the fork.

It will be understood that other embodiments of these foolproof and maintaining means may be envisaged.

Thus, before screwing the nut, the maintaining and thrust element 11 may be arranged to extend between the lateral walls 6 and 7 of the fork and that either one or both of the ends of the rings 14 and 15 extend beyond these lateral walls 6 and 7.

When screwing, the nut 10 first of all comes to abut against the end of one of the rings so that if the nut is continued to be screwed along the rod, the latter has a tendency to exert a thrust on this ring so that the central web 13 of the thrust element is deformed and exerts a force on the male element 3, urges it toward the inner end of the fork and applies the lower face of the male element 3 against the intermediate wall 12 of the fork 4.

When this deformation has been achieved, the clamping nut 10, in continuing to be screwed along the rod, urges the side walls 6 and 7 of the fork 4 toward each other and clamps and holds fast the male element in position in the fork.

The existing assembly clearances are therefore reduced or even eliminated.

Further, this maintaining and thrust element which is part of the device according to the invention constitutes a safety element whereby the male element is maintained in position in the fork in the event of breakage of the rod.

Indeed, this maintaining and thrust element which is independent of the rod remains in position between the lateral walls 6 and 7 of the fork, even if the rod breaks.

Other embodiments of this maintaining and thrust element deformable by compression are shown in FIGS. 2, 3, 4 and 5.

However, this maintaining and thrust element may also include a web 13 having four deformable strips disposed at 90° to one another around the rod, as shown in FIG. 3.

In FIG. 4, another embodiment is shown in which the maintaining and thrust element comprises solely a mounting ring 18 connected to a deformable strip 19.

In these Figures, it is clear that the or each strip has a preferential deformation region, this region being defined for example by portions of these strips which are initially deformed in the shape of ramps.

FIG. 5 shows another embodiment of a maintaining element 11 in which the central web 13 of the latter extending between the mounting rings 14 and 15 has a planar preferential deformation region whose cross-section is larger than that of the rings.

These preferential deformation regions which, in the illustrated embodiments, have cross-sections larger than those of the mounting rings, permit orientation of the deformation of the maintaining and thrust element and also constitute means for maintaining in position this element between the lateral walls of the fork in the event of breakage of the rod, in that they have a cross-section larger than that of the cavities 16, 17 provided in the lateral walls 6 and 7 of the fork, so that a certain force must be exerted on this element to engage it between these lateral walls. This engagement is then possible owing to a deformation, for example elastic, of these regions.

It will therefore be understood that the maintaining and thrust element of the safety clamping device according to the invention may have a double function, depending on its structure.

Indeed, this element may constitute a safety element whereby it is possible to maintain the male element in the fork in the event of breakage of the rod, and a thrust element which urges the male element against the intermediate wall 12 of the fork for reducing and even eliminating the assembly clearances.

This is made possible by the fact that this maintaining and thrust element is disposed alongside the rod and is independent of the latter, that it has for example a deformation capability different from that of the rod and that it is not subjected to the stresses exerted on the latter.

It must be understood that other embodiments of the maintaining and thrust element may be envisaged without departing from the scope of the invention defined in the claims.

What is claimed is:

1. Device for a safety clamping of a male element in a fork comprising two lateral walls and an intermediate wall interconnecting said lateral walls of a female element, of use in particular for interconnecting two portions of an automobile vehicle steering column, said device comprising a rod extending between said lateral walls and having an end portion defining a stop surface for bearing against one of said lateral walls and another end portion which is screw threaded, a clamping nut screw-threadedly engaged on said screw-threaded end portion for urging, upon screwing between said nut and said screw-threaded end portion, said lateral walls toward each other and thereby clamping said male element in said fork, and means for ensuring that said male element is safely maintained in position in said fork in the event of breakage of said rod, said maintaining means comprising a maintaining element disposed alongside said rod and having end portions which are cooperative with said lateral walls for maintaining said male element in said fork.

2. Device according to claim 1, wherein said maintaining element is adapted to exert, upon said screwing, a thrust force which urges said male element against said intermediate wall of said fork.

3. Device according to claim 2, wherein said maintaining element comprises an element which is radially expansible under the effect of compression thereof upon said screwing, said radially expansible element being disposed alongside said rod and being capable of urging said male element against said intermediate wall of said fork upon deformation of said radially expansible element.

4. Device according to claim 3, wherein said expansible element has a length exceeding the distance between said lateral walls of said fork before said screwing, so as to be deformed and therefore urge said male element against said intermediate wall before said lateral walls are urged closer together by said screwing.

5. Device according to claim 4, wherein said expansible element comprises a sleeve of deformable material disposed around said rod.

6. Device according to claim 4, wherein said expansible element comprises a deformable portion and mounting means extending around said rod, cavities corresponding to said mounting means being provided in said lateral walls and receiving said mounting means.

7. Device according to claim 6, wherein said deformable element comprises a deformable central web means extending alongside said rod between said mounting means which are in the form of two mounting rings.

8. Device according to claim 7, wherein said central web means is formed by at least one strip of deformable material in one piece with said rings.

9. Device according to claim 8, wherein said central web means comprises two strips of deformable material disposed on each side of said rod.

10. Device according to claim 8, wherein said central web means comprises four strips of deformable material disposed at 90° to one another around said rod.

11. Device according to claim 8, comprising foolproof means for maintaining said maintaining and thrust element in position in said fork so that it is engaged between said lateral walls in such manner that said at least one strip is in facing relation to said male element and maintained in said position upon said screwing.

12. Device according to claim 11, wherein said foolproof maintaining means comprise a polygonal cross-sectional shape of at least one of said mounting rings for engagement in and cooperation with a respective one of said cavities, which respective cavity has a cross-sectional shape complementary to said cross-sectional shape of said at least one mounting ring.

13. Device according to claim 3, wherein said radially expansible element comprises preferential expansible regions.

14. Device according to claim 13, wherein said expansible element comprises mounting means extending around said rod, cavities corresponding to said mounting means are provided in said lateral walls for receiving said mounting means, and said preferential expansible regions are formed by initially-deformed portions of said expansible element which have cross-sections larger than the cross-sections of said mounting means.

15. Device according to claim 1, wherein said maintaining element comprises means for maintaining it in position between said lateral walls of said fork in the event of breakage of said rod.

16. Device according to claim 14, wherein said maintaining element comprises means for maintaining it in position between said lateral walls of said fork in the event of breakage of said rod, and said means for maintaining said maintaining element in position comprise said preferential expansible regions of said maintaining element.

* * * * *